May 14, 1940.   F. A. DEUTSCH   2,201,030
REGULATING VALVE FOR HYDRAULIC SHOCK ABSORBERS
Filed May 12, 1937
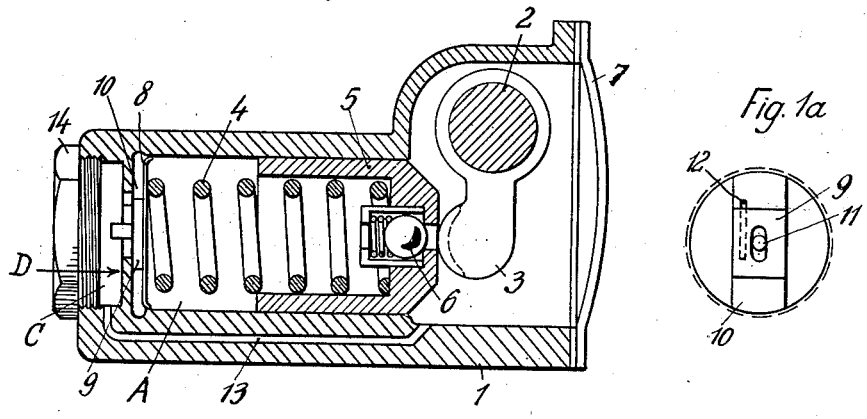
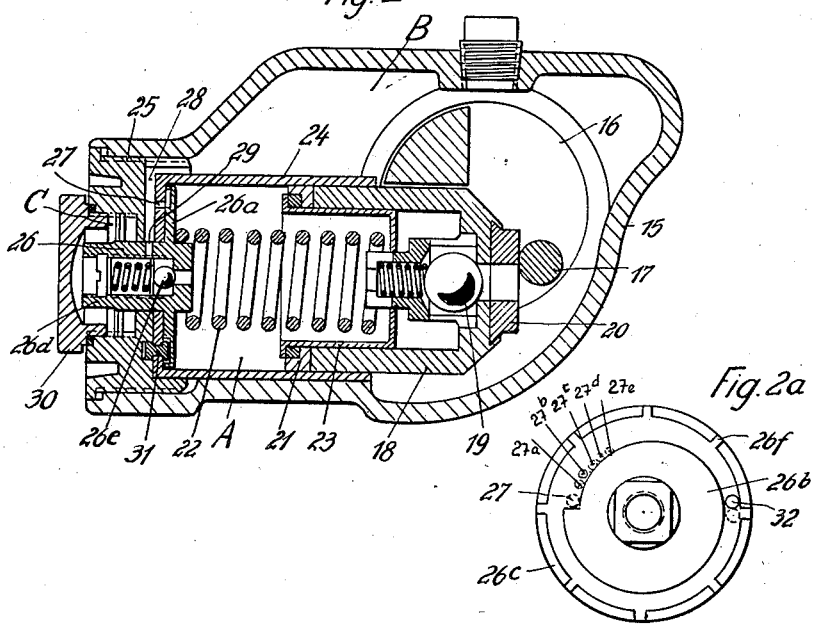
Inventor:
FRITZ ALBERT DEUTSCH
Kuris Hudson & Kent
Attorneys Patented May 14, 1940

2,201,030

UNITED STATES PATENT OFFICE 2,201,030

REGULATING VALVE FOR HYDRAULIC SHOCK ABSORBERS

Fritz Albert Deutsch, Berlin-Wilmersdorf, Germany, assignor to Elizabeth S. Oberstadt, Cleveland, Ohio Application May 12, 1937, Serial No. 142,156
In Germany May 12, 1936

6 Claims. (Cl. 267—8)

This invention relates to a control or regulating valve of the kind intended for regulating the braking, damping or retarding effect of hydraulic systems by hydro-dynamic or hydraulic friction produced by displacing a liquid through a small throttling channel or aperture.

Hydraulic devices or systems of the kind to which my invention relates may be used as hydraulic shock absorbers, more particularly for autocars and trucks, hydraulic lever or lifting devices, hydraulically damped door closers, hydraulically acting liquid brakes for vehicles and the like.

The invention will be better understood by reference to the following detailed description in connection with the accompanying drawing, showing schematically and by way of example, two embodiments of the invention, viz—

Fig. 1 is a longitudinal section through a regulating device in which the control member is moved in a rectilinear path and closes a slot more or less by its movement;

Fig. 1a is a detail of Fig. 1, viewed against the control member from D;

Fig. 2 is a longitudinal section through a regulating device in which the control member is rotatably mounted, its controlling edge being shaped to a spiral curve.

Fig. 2a is a detail of the device shown in Fig. 2, showing the surface of the control member which rests on the aperture in the wall of the pressure chamber.

My improved regulating valve is of the kind in which the braking effect of the hydraulic device is adjusted by more or less closing the cross-section of the throttling channel while the cross-section of the throttling channel is maintained after its adjustment independently from the hydraulic conditions prevailing in the pressure chamber of the device.

In order to render such control valves fully effective it is necessary that the whole amount of liquid displaced by the displacement- or plunger-piston is displaced through the throttling channel cross section. However, in the majority of the known regulating valves of the aforedescribed kind this is not the case. The regulating or control valves are customarily formed as cylindrical pistons which are made to tightly fit into a corresponding cylindrical bore. The passage cross section of the throttling channel is more or less closed or covered up, as desired, by rotating the regulating pistons round their axis or by displacing them lengthwise. In control valves of this construction, however, it cannot be avoided that a portion of the damping liquid passes through the annular gap which is always present between the regulating piston and its bore due to the tolerance of the respective dimensions.

It is the object of the invention to eliminate this disadvantage.

To this end a plane disc or plate is used as a control member instead of a cylindrical piston, which disc under action of the pressure of the liquid is forced against a plane surface area provided at any point of the pressure chamber of the device, thus tightly engaging this surface and adjustably closing the discharge aperture for the regulating flow. The said plane disc is advantageously made of a soft material so that it will tightly engage the plane surface of the pressure chamber, under action of the hydraulic pressure, even in case of slight unevenness in this surface due to imperfect treatment of the same or the like. The adjustment of the control disc for the purpose of changing the regulating flow may be effected by any suitable means. Suitable recesses may be provided in one or both of the co-acting members for receiving the adjusting means.

The displacement of the control disc for the purpose of adjusting the damping effect may take place by way of movement in any direction, for instance by rectilinear or rotary movement. In case of a rotary movement the edge of the disc is formed to a spiral-shaped curve, for causing a damping effect which increases as the disc is swung round the center point of the spiral curve.

A particular advantage of my novel device resides in the fact that it lends itself very well for the attainment of a thermostatical effect, i. e. changes of its regulating characteristics due to temperature changes, such as thermal expansion etc. can be compensated by the selection of suitable material and/or suitable design and shape of its component parts, without additional means.

Referring now to the drawing, Fig. 1 represents my device as applied to a single-acting piston shock absorber moved in a rectilinear path.

The shaft 2 is mounted in the housing or casing I of the shock absorber and is actuated, through levers and connecting rods not specifically shown in the drawing, in dependence of the relative movement of the axle with respect to the chassis of the vehicle. Fast on shaft 2 is a cam 3 which co-acts with the plunger or displacing piston 5 under action of the piston spring 4. Centrally fitted in the piston 5 is the spring-acted check valve ball 6 which does not permit the liquid to flow from the pressure chamber A into the reservoir B, due to the hydraulic pressure in the pressure chamber A, but on the other hand admits liquid from the reservoir B into the pressure chamber A.

The reservoir B is liquid-tightly closed by the cover 7.

The left hand end of the piston spring 4 is supported by the spring washer 8 which in turn rests on the control member which in this case takes the form of the slide 9 thus resiliently pressing slide 9 against the face-cut, plane and slotted surface 10 provided in the end or bottom portion of the housing 1.

The end or bottom portion is specifically shown in Fig. 1a. The slide 9 can be rectilinearly moved and is guided in the slot of the surface 10 by its projection 11. I contemplate to use other guiding means and interposed operating rods or the like also. The face-cut surface 10 is formed with a regulating slot 12 which is more or less covered up or closed by the movement of the slide 9, in the desired manner.

By the slot 12 the pressure chamber A is connected with the regulating chamber C which in turn is connected, through the return channel 13, with the reservoir B. The regulating chamber C is liquid-tightly closed by a closure screw 14 which at the same time renders the regulating mechanism accessible.

The operation of the aforedescribed device is as follows:

In the suction stroke the shaft 2 is rotated in an anti-clockwise direction and the cam 3 and the piston 5 are moved to the right in the drawing. The pressure chamber A is filled, through the valve 6, with an amount of liquid from the reservoir chamber B which corresponds to the free space left in the pressure chamber by the movement of the piston.

Now, during the effective or working stroke of the shock absorber the check valve 6 in the piston is closed; consequently the only outlet for the liquid displaced from the pressure chamber A by the piston 5 is through the regulating slot 12 and accordingly the liquid will be discharged gradually into the reservoir B through the return channel 13. The displacement of the liquid through the regulating slot 12 causes a hydraulic resistance or pressure the amount of which may be adjusted as desired by displacing the slide 9. It will be understood that the hydraulic pressure acts upon the spring washer 8 and thus on the slide 9, pressing the same tightly against the plane surface 10. By this arrangement the while liquid displaced by the piston 5 is compelled to flow off exclusively through the slot 12 so that the efficiency of the regulating device will not be affected by undesirable outlet channels for the liquid.

A similar embodiment of my invention is represented in Figs. 2 and 2a, comprising an interchangeable shock-absorber-"cartridge."

The construction in Figs. 2 and 2a differs from Figs. 1 and 1a in that a fixed shaft is provided round which the control slide is rotated or swung in order to more or less cover up the throttling slot or aperature (Fig. 2a).

The shock absorber in this case is constructed as follows:

A shaft 16 is supported in the housing 15 of the shock absorber and acts upon the piston 18 by its pin 17. The piston 18 is fitted with the spring-acted check-valve 19 and with a hardened pressure plate 20 which is intended to reduce the wear of the front face of the piston which is exposed to the working pressure. The piston 18 is fitted with collars 21 which are acted on by the piston spring 22, through the interposed collar holder 23, thus always ensuring a resilient contact between the collar and the piston. The piston is rectilinearly guided in the cylinder 24 which is supported in the closure screw 25 screwed into a threaded bore of the casing 15.

Rotatably disposed in the central bore of the closure screw 25 is the real control member 26, consisting of a plate 26a (see Fig. 2a) having an inner edge 26b shaped to the form of a spiral curve and a concentric, circular outer edge 26c in which radial slots 26f are formed. Moreover the regulating member is formed with a cylindrical shaft 26d in which the spring-acted adjustable excess pressure valve 26e is accommodated.

The cylinder 24 is formed with a bore 27 which is more or less closed or covered up by the spiral-shaped edge 26b of the control member 26, the open cross-section depending on the angular position of the control member. The bore 27 opens into the discharge channel 28 which forms the connection with the reservoir B of the shock-absorber. In addition, a radial bore 29 is produced in the cylindrical shaft 26d of the control member 26.

Similarly to Fig. 1, the regulating chamber is denoted with C. It is liquid-tightly closed by a closure screw 30.

Inserted in the bottom of the cylinder 24 is a headed rivet 31 forming a stop member for the swinging movement of the control member 26 which is formed with a corresponding projection 32 that strikes against the rivet 31 in the desired angularly displaced position.

The operation of the shock-absorber corresponds substantially to that described with reference to Figs. 1 and 1a.

The pressure chamber A is filled with liquid during the suction stroke from the filling chamber or reservoir B through the spring acted globe valve 19 and the liquid is discharged, during the working stroke of the device, through the regulating aperture 27 and the connecting channel 28, into the filling chamber B. It will be understood that the regulating aperture 27 is covered up more or less by the control member 26, depending on its angular position, so that the braking or damping force developed by the shock-absorber can be controlled and adjusted in the desired manner.

The exterior edge of the control member 26 rests tightly on the bottom face of the cylinder 24. Due to the radial grooves 26f in the member 26 the displaced liquid is forced to pass along the inner faces of the cylinder 24 at a high speed. Thus the air is carried along with the liquid thus fully removing the air from the pressure chamber of the shock absorber.

The position of the stop 31 relative to the projection 32 of the control member 26 is chosen so that it will prevent a further rotary movement of the member 26 as soon as the maximum throttling effect of the shock absorber has been reached, i. e. as soon as the spiral curve has reached its largest diameter, relative to the regulating aperture.

The excess pressure valve 26e disposed in the cylindrical portion 26d of the regulating member 26 is merely intended to limit the maximum pressure of the shock absorber. When this maximum pressure is reached, the ball 26e is lifted and the liquid is discharged, past the ball, through the radial bore 29 and the discharge channel 28, into the filling chamber B. The maximum pressure limit determined by the excess pressure valve can be adjusted by setting a regulating screw 33 by which the valve spring 34 can be more or less compressed thus changing the resilient tension thereof acting upon the valve ball 26e.

I contemplate within the purview of my invention, the attainment of a particular effect which can be performed by my novel device without additional means, as follows:

By the use of different materials, i. e. materials having different coefficients of thermal expansion, for the cylinder 24 and the control member 26, it is possible to attain automatically a thermostatic compensation effect in case of temperature changes of the shock absorber, so that the damping effect remains substantially constant even in case of temperature changes. By suitably choosing the shape of the regulating bore 27, the distance of this regulating bore from the center or pivot axis of the control member 26 and the materials being used (cylinder and control member) it is possible to obtain any desired thermostatic effect. Practical experiments have shown that a sufficient thermostatic effect can be obtained also by a circular regulating bore in connection with a spiral-shaped regulating curve 26b, provided that the distance of the regulating aperture from the pivot axis of the control member has been correctly chosen.

A similar effect can be performed by the device shown in Fig. 1. I contemplate, however, to use a plurality of apertures of smaller diameter instead of one aperture 27, as shown by 27a, 27b, 27c in Fig. 2a in order to perform a thermostatic function, since such a construction will be more susceptible to react against changes of the throttling cross section caused by temperature differences.

While I have hereinbefore shown my novel device as applied to specific apparatus I wish it to be understood that I do not confine myself to the use of my device in connection with the illustrated apparatus, as the invention may be used in combination with hydraulic braking or damping apparatus of any description.

Also it is possible, by suitable choice of the regulating channel and regulating curve, to obtain any desired regulating characteristics in the respective damping apparatus.

I claim:

1. In a hydraulic device of the character described, a pressure chamber having a plane surface area on the inner wall thereof, a piston operable in said pressure chamber, a discharge aperture in said plane surface area for the passage of liquid displaced by movement of said piston, means for actuating the piston for subjecting the liquid of said chamber to pressure, a compression spring in the pressure chamber adapted to act on the piston to retract the same, a control member held against said plane surface area by said spring and adapted to be forced into fluid-tight engagement with said plane surface area by the hydraulic pressure created in the pressure chamber by movement of the piston therein, said control member being movable in a plane parallel to said plane surface area when relieved from the pressure of the liquid, and means cooperating with said control member for guiding the movement thereof whereby the free cross-section of the discharge aperture and the hydraulic resistance produced in the device is adjustable.

2. In a hydraulic device of the character described, a pressure chamber having a plane surface area on the inner wall thereof, a piston operable in said pressure chamber, a discharge aperture in said plane surface area for the passage of liquid displaced by movement of said piston, means for actuating the piston for subjecting the liquid of said chamber to pressure, a compression spring in the pressure chamber adapted to act on the piston to retract the same, a control member held against said plane surface area by said spring and adapted to be forced into fluid-tight engagement with said plane surface area by the hydraulic pressure created in the pressure chamber by movement of the piston therein, said control member being shiftable laterally and rectilinearly on said plane surface area when relieved from the pressure of the liquid whereby the free cross-section of said discharge aperture and the hydraulic resistance produced in the device is adjustable, and cooperating pin and slot elements for guiding the control member during shifting thereof.

3. In a hydraulic device of the character described, a cylinder having a substantially flat area at its inner end and a discharge opening in such area, a piston operable in the cylinder for subjecting liquid therein to pressure, means for actuating the piston, a compression spring in the cylinder adapted to act on the piston for retracting the same, and a pivoted control member pressed against said flat surface by said spring and adapted to be forced into fluid-tight engagement with said surface by the pressure of the liquid in the cylinder, said control member overlying said discharge opening and adapted to be swung on its pivot axis when relieved from the pressure of the liquid for varying the free cross-section of said discharge opening and the hydraulic resistance value of the device.

4. A hydraulic device as defined in claim 3 wherein the control member has a spiral groove in the face thereof adjacent said substantially flat surface and which groove varies in width for varying the free cross-section of said discharge opening upon swinging of the control member.

5. A hydraulic device as defined in claim 3 in which the control member has a plate-like portion overlying said discharge aperture and provided with a groove of varying width for varying the free cross-section of the discharge aperture upon swinging of the control member, and said control member also having substantially radially extending slots therein for connecting said groove with the cylinder.

6. A hydraulic device as defined in claim 1 in which the wall of the pressure chamber and the control member are made of materials having different coefficients of thermal expansion for compensating for the influence of temperature changes in the hydraulic pressure effect produced by the displacement of the liquid through the discharge aperture.

FRITZ ALBERT DEUTSCH.